(12) United States Patent
Seo et al.

(10) Patent No.: US 9,357,405 B2
(45) Date of Patent: May 31, 2016

(54) METHOD OF REDUCING INTERCELL INTERFERENCE IN WIRELESS COMMUNICATION SYSTEM AND APPARATUS THEREOF

(75) Inventors: Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 13/978,111

(22) PCT Filed: Oct. 24, 2011

(86) PCT No.: PCT/KR2011/007934
§ 371 (c)(1),
(2), (4) Date: Jul. 2, 2013

(87) PCT Pub. No.: WO2012/099319
PCT Pub. Date: Jul. 26, 2012

(65) Prior Publication Data
US 2013/0279361 A1  Oct. 24, 2013

Related U.S. Application Data

(60) Provisional application No. 61/434,813, filed on Jan. 20, 2011, provisional application No. 61/441,650, filed on Feb. 10, 2011, provisional application No. 61/446,507, filed on Feb. 25, 2011.

(51) Int. Cl.
*H04W 24/02* (2009.01)
*H04J 11/00* (2006.01)
(Continued)

(52) U.S. Cl.
CPC ............ *H04W 24/02* (2013.01); *H04J 11/0053* (2013.01); *H04W 24/10* (2013.01); *H04W 72/0406* (2013.01); *H04W 72/085* (2013.01)

(58) Field of Classification Search
CPC . H04W 24/02; H04W 24/10; H04W 72/0406; H04W 72/085; H04J 11/0053
See application file for complete search history.

(56) References Cited

U.S. PATENT DOCUMENTS

2009/0253448 A1  10/2009 Kwon et al.
2010/0238889 A1   9/2010 Kim et al.
(Continued)

FOREIGN PATENT DOCUMENTS

EP       2182649        5/2010
KR   10-2009-0102419 A  9/2009

OTHER PUBLICATIONS

ZTE, "Discussion on CRS interference and CSI measurements in macro-pico deployment", Nov. 15-19, 2010, 3GPP TSG RAN WG1 Meeting #63, R1-105969, pp. 1-4.*

(Continued)

*Primary Examiner* — Paul H Masur
(74) *Attorney, Agent, or Firm* — Dentons US LLP

(57) ABSTRACT

A method for processing a signal processing at a user equipment in a wireless communication system is disclosed. The method includes receiving an interference measurement subframe set from a serving cell, receiving first Channel Status Information (CSI) configuration information and second CSI configuration information from the serving cell, measuring CSI based on the first CSI configuration information in a subframe designated in the interference measurement subframe set and reporting the CSI to the serving cell, and measuring the CSI based on the second CSI configuration information in a subframe which is not designated in the interference measurement subframe set and reporting the CSI to the serving cell.

12 Claims, 13 Drawing Sheets

(51) Int. Cl.
  *H04W 24/10* (2009.01)
  *H04W 72/04* (2009.01)
  *H04W 72/08* (2009.01)

(56) References Cited

U.S. PATENT DOCUMENTS

| 2012/0082052 A1* | 4/2012 | Oteri et al. ............... 370/252 |
| 2012/0120846 A1* | 5/2012 | Hwang et al. ............ 370/254 |
| 2012/0157082 A1* | 6/2012 | Pedersen et al. ........ 455/422.1 |
| 2013/0003788 A1* | 1/2013 | Marinier ............... H04B 7/024 375/219 |

OTHER PUBLICATIONS

Alcatel-Lucent, "Remaining aspects of CSI-RS parameters and signaling", Oct. 11-15, 2010, 3GPP TSG RAN WG1 Meeting #62bis, R1-105201, pp. 1-3.*
Huawei, "Signaling and UE Behaviors for Resource-Specific CSI Measurements", Nov. 15-19, 2010, 3GPP TSG RAN WG1 meeting #63, R1-105852, pp. 1-4.*
Qualcomm, "eICIC CSI feedback requirements", Oct. 11-15, 2010, 3GPP TSG-RAN WG4 2010 AH#4, R4-103791, pp. 1-2.*
LG Electronics, "Remaining issues for aperiodic CSI triggering", Jan. 17-21, 2011, 3GPP TSG RAN WG1 #63bis, R1-110365, pp. 1-2.*
QUALCOMM Incorporated: "Signaling and Configuration of CSI-RS", 3GPP Draft; R1-104797 Signaling and configuration of CSI-RS, 3rd Generation Partnership Project (3GPP), Mobile Comptence Centre; 650, Route Des Lucioles; F-06921 Sophia-Antipolis Cedex; France, vol. RAN WG1, no Madrid, Spain; 20100823, Aug. 17, 2010, XP050449989.
Texas Instruments: "PDSCH Muting: N-MSE for Inter-cell CSI Estimation", 3GPP Draft; R1-103698 TI NMSE for Inter-cell CSI estimation, 3rd Generation Partnership Project (3GPP), Mobile Comptence Centre; 650, Route Des Lucioles; F-06921 Sophia-Antipolis Cedex; France, vol. RAN WG1, no Dresden, Germany; 20100628, Jun. 22, 2010, XP050449134
QUALCOMM Incorporated: "CSI measurement reference", 3GPP Draft; R1-106361 CSI measurement reference, 3rd Generation Partnership Project (3GPP), Mobile Comptence Centre; 650, Route Des Lucioles; F-06921 Sophia-Antipolis Cedex; France, vol. RAN WG1, no Jacksonville, USA; 20101115, Nov. 9, 2010, XP050489736.
QUALCOMM Incorporated: "Finalizing Signaling and Configuration of CSI-RS", 3GPP Draft; R1-105565 Finalizing signaling and configuration of CSI-RS, 3rd Generation Partnership Project (3GPP), Mobile Comptence Centre; 650, Route Des Lucioles; F-06921 Sophia-Antipolis Cedex; France, vol. RAN WG1, no Xi'an; 20101011, Oct. 5, 2010, XP050450663.

* cited by examiner

--PRIOR ART--

FIG. 2
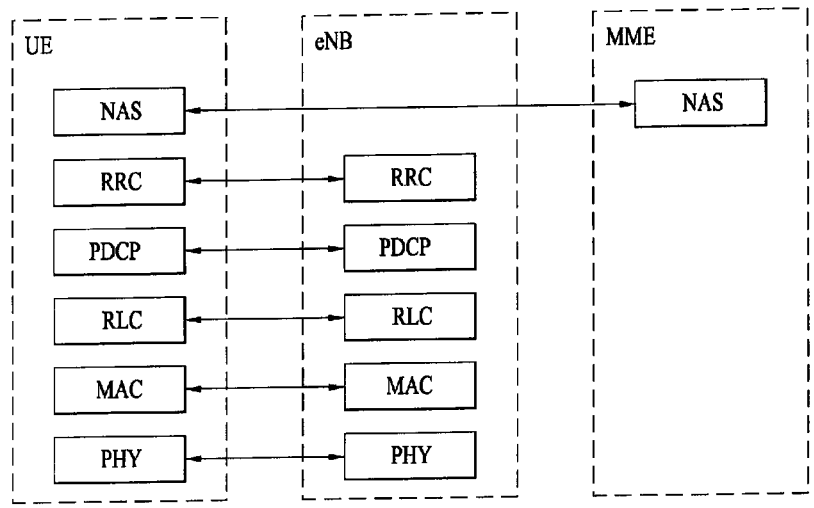
(a) CONTROL-PLANE PROTOCOL STACK
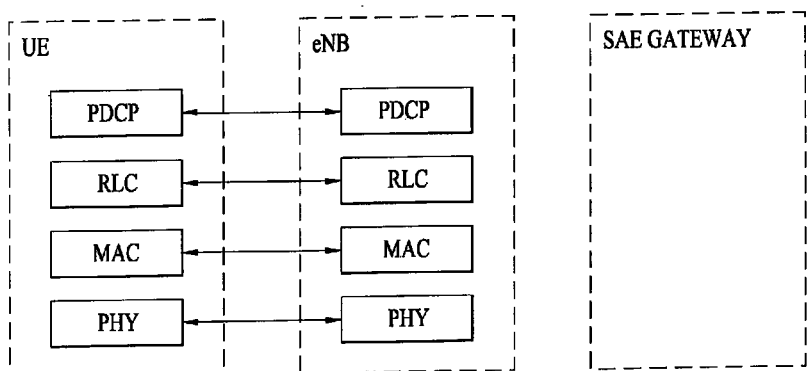
(b) USER-PLANE PROTOCOL STACK

METHOD OF REDUCING INTERCELL INTERFERENCE IN WIRELESS COMMUNICATION SYSTEM AND APPARATUS THEREOF

This application is a 35 U.S.C. §371 National Stage Entry of International Application No. PCT/KR2011/007934, filed Oct. 24, 2011 and claims the benefit of U.S. Provisional Application Nos. 61/434,813, filed Jan. 20, 2011, 61/441,650, filed Feb. 10, 2011, and 61/446,507, filed Feb. 25, 2011, all of which are incorporated by reference in their entirety herein.

TECHNICAL FIELD

The present invention relates to a wireless communication system, and more particularly, to a method for reducing intercell interference in a wireless communication system, and an apparatus thereof.

BACKGROUND ART

As an example of a mobile communication system to which the present invention is applicable, a 3rd Generation Partnership Project Long Term Evolution (hereinafter, "LTE") communication system is described in brief.

FIG. 1 is a diagram schematically showing a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNode Bs may simultaneously transmit multiple data streams for a broadcast service, a multicast service, and/or a unicast service.

One or more cells may exist in one eNode B. A cell is set to use one of bandwidths of 1.25, 2.5, 5, 10, and 20 MHz to provide a downlink or uplink transport service to several UEs. Different cells may be set to provide different bandwidths. The eNode B controls data transmission and reception for a plurality of UEs. The eNode B transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNode B transmits uplink scheduling information with respect to uplink data to a corresponding UE to inform the UE of an available time/frequency domain, coding, data size, and HARQ-related information. An interface for transmitting user traffic or control traffic may be used between eNode Bs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), demands and expectations of users and providers continue to increase. In addition, since other radio access technologies continue to be developed, new technical evolution is required to secure future competitiveness. For example, decrease of cost per bit, increase of service availability, flexible use of a frequency band, simple structure, open interface, and suitable power consumption of a UE are required.

DISCLOSURE

Technical Problem

An object of the present invention devised to solve the problem lies in providing a method and apparatus for reducing intercell interference in a wireless communication system.

Technical Solution

According to an aspect of the present invention, a signal, processing method of a user equipment in a wireless communication system includes receiving an interference measurement subframe set from a serving cell, receiving first Channel Status Information (CSI) configuration information and second CSI configuration information from the serving cell, measuring CSI based on the first CSI configuration information in a subframe designated in the interference measurement subframe set and reporting the CSI to the serving cell, and measuring the CSI based on the second CSI configuration information in a subframe which is not designated in the interference measurement subframe set and reporting the CSI to the serving cell.

According to another aspect of the present invention, a user equipment in a wireless communication system includes a reception module for receiving an interference measurement subframe set, first Channel Status Information (CSI) configuration information, and second CSI configuration information from a serving cell, a processor for measuring CSI based on the first CSI configuration information in a subframe designated in the interference measurement subframe set, and measuring the CSI based on the second CSI configuration information in a subframe which is not designated in the interference measurement subframe set, and a transmission module for transmitting the measured CSI to the serving cell.

The interference measurement subframe set may be received from a neighbor cell by the serving cell through an X2 interface, and the neighbor cell may configure the subframe designated in the interference measurement subframe set as an Almost Blank Subframe (ABS) and/or a Multicast Broadcast Single Frequency Network (MBSFN) subframe.

The neighbor cell may perform joint processing transmission for the user equipment together with the serving cell in the subframe designated in the interference measurement subframe set.

The interference measurement subframe set, the first CSI configuration information, and the second CSI configuration information may be received from the serving cell through an upper layer.

The first CSI configuration information and the second CSI configuration information may be received from the serving cell through an upper layer, and the serving cell may designate the first CSI configuration information through a Physical Downlink Control Channel (PDCCH) in the subframe designated in the interference measurement subframe set and designate the second CSI configuration information through the PDCCH in the subframe which is not designated in the interference measurement subframe set.

Advantageous Effects

According to the embodiments of the present invention, a joint processing scheme can be effectively applied in a wireless communication system to which a CoMP scheme is applied.

The effects which can be obtained from the present invention are not limited to the above-mentioned effects, and other effects not mentioned above can be clearly understood by one skilled in the art from the following description of the embodiments of the present invention.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram showing structures of a control plane and a user plane of a radio interface protocol between a UE and an E-UTRAN based on the 3GPP radio access network specification;

MODE FOR INVENTION

Figure 1:
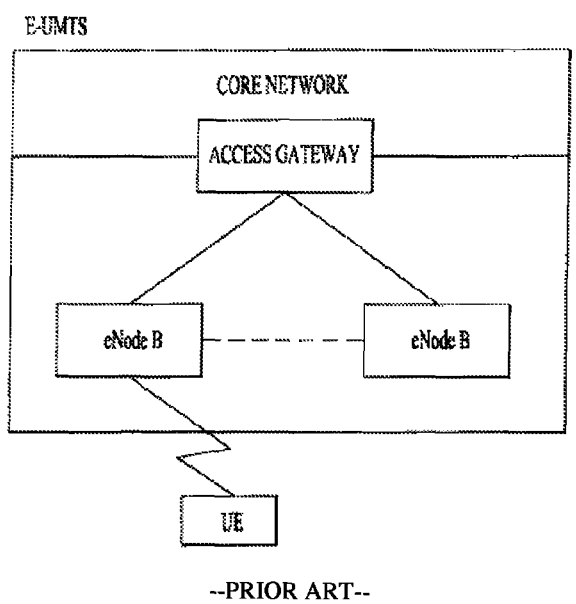
FIG. 1 is a diagram schematically showing a network structure of an E-UMTS as an exemplary radio communication system.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention will be described based on an LTE system and an LTE-A system, the LTE system and the LTE-A system are only exemplary and the embodiments of the present invention can be applied to all communication systems corresponding to the aforementioned definition. Also, although the embodiments of the present invention will herein be described based on FDD mode, the FDD mode is only exemplary and the embodiments of the present invention can easily be applied to H-FDD or TDD.

FIG. 2 is a diagram showing structures of a control plane and a user plane of a radio interface protocol between a UE and an E-UTRAN based on the 3GPP radio access network specification. The control plane refers to a path used for transmitting control messages, which are used by a User Equipment (UE) and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. Radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
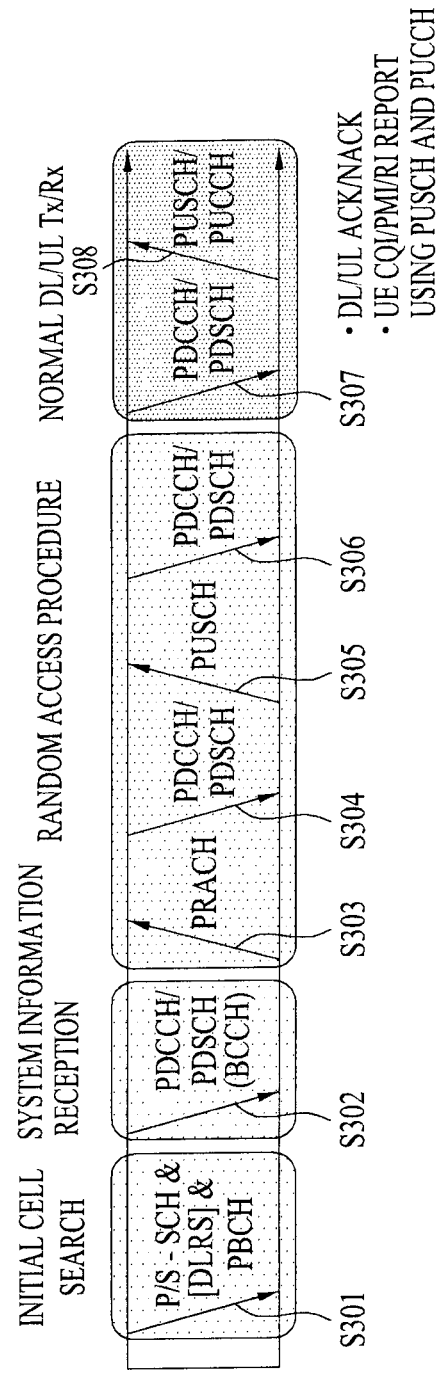
FIG. 3 is a diagram showing physical channels used in a 3GPP system and a general signal transmission method using the same.

FIG. 3 is a diagram showing physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information transmitted by the UE to the eNB through uplink or received by the UE from the eNB through downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
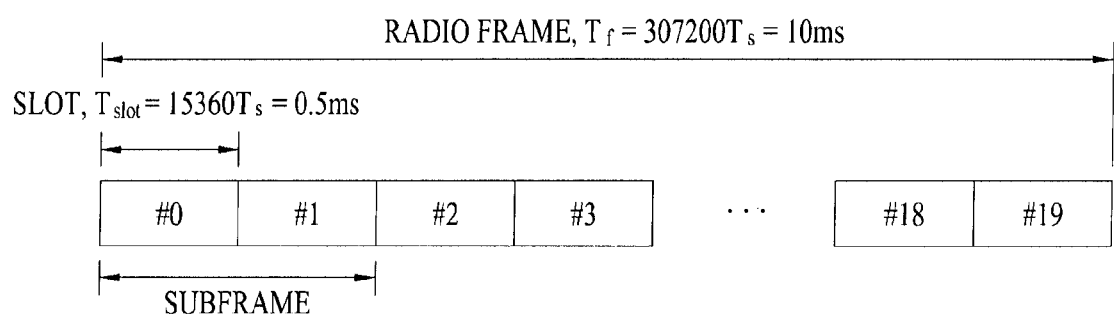
FIG. 4 is a diagram showing the structure of a radio frame used in an LTE system.

FIG. 4 is a diagram showing the structure of a radio frame used in an LTE system.

Referring to FIG. 4, the radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15 kHz \times 2048)=3.2552\times10^{-8}$ (about 33 ns). Each slot includes a plurality of OFDM symbols or SC-FDMA symbols in a time domain and includes a plurality of resource blocks in a frequency domain. In the LTE system, one resource block includes 12 subcarriers×7 (or 6) OFDM symbols or SC-FDMA symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
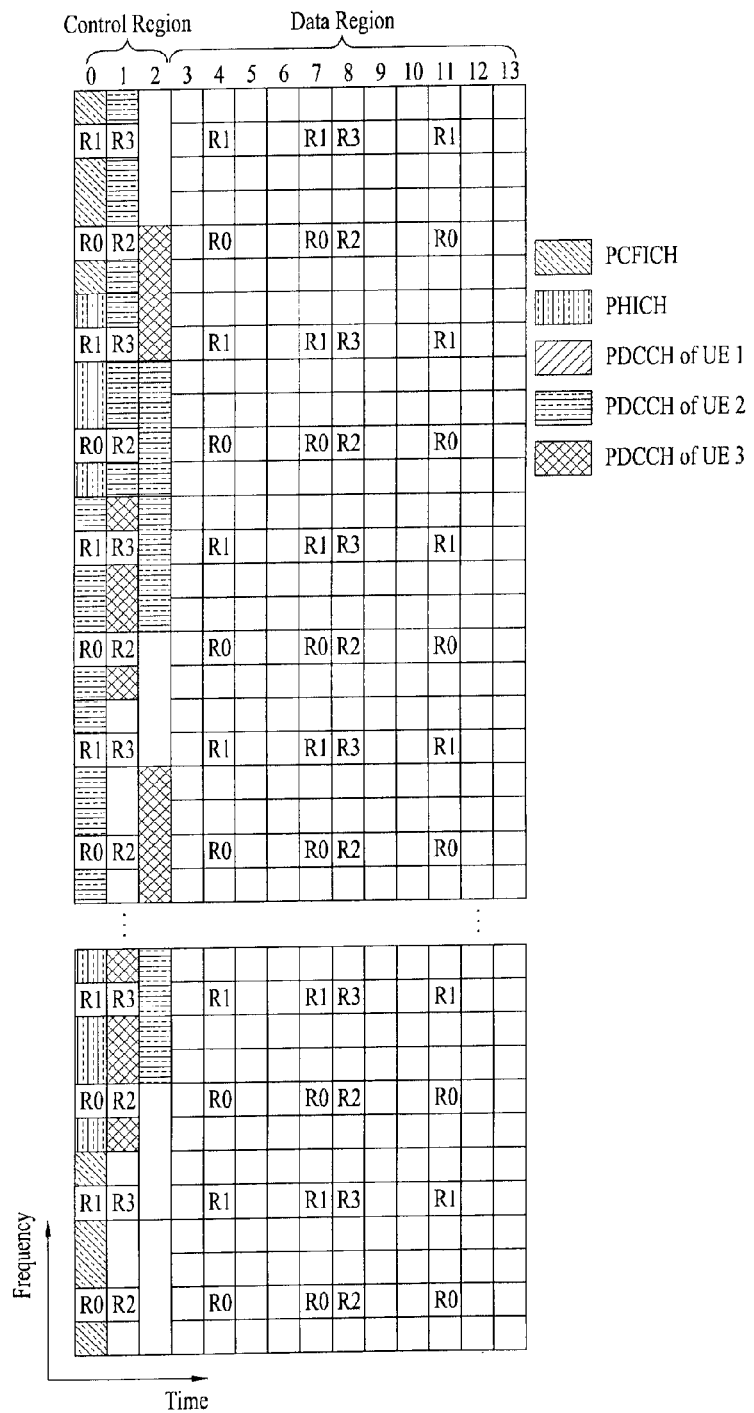
FIG. 5 is a diagram showing the structure of a downlink radio frame used in an LTE system.

FIG. 5 is a diagram showing a control channel contained in a control region of one subframe in a downlink radio frame.

Referring to FIG. 5, one subframe includes 14 OFDM symbols. First to third ones of the 14 OFDM symbols may be used as a control region and the remaining OFDM symbols (i.e., 13 to 11 OFDM symbols) may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources, to which the RS is not allocated, in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain a diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) 'A', and information about data, that is transmitted using radio resources 'B' (e.g., frequency location) and transport format information 'C' (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Hereinafter, a MIMO system will be described. Multiple-Input Multiple-Output (MIMO) refers to a method of using multiple transmission antennas and multiple reception antennas to improve data transmission/reception efficiency. Namely, a plurality of antennas is used in a transmitting end or a receiving end of a wireless communication system so that capacity can be increased and performance can be improved. Hereinafter, MIMO may indicate multiple antennas in this document.

MIMO technology does not depend on a single antenna path in order to receive a single message. Instead, MIMO technology collects data fragments received via several antennas, merges the data fragments, and forms complete data. The use of MIMO technology can increase system coverage while improving data transmission rate within a cell area of a specific size or guaranteeing a specific data transmission rate. MIMO technology can be widely used in mobile communication terminals and relay nodes. MIMO technology can overcome the limitations of the restricted amount of transmission data of single antenna based mobile communication systems.

Figure 6:
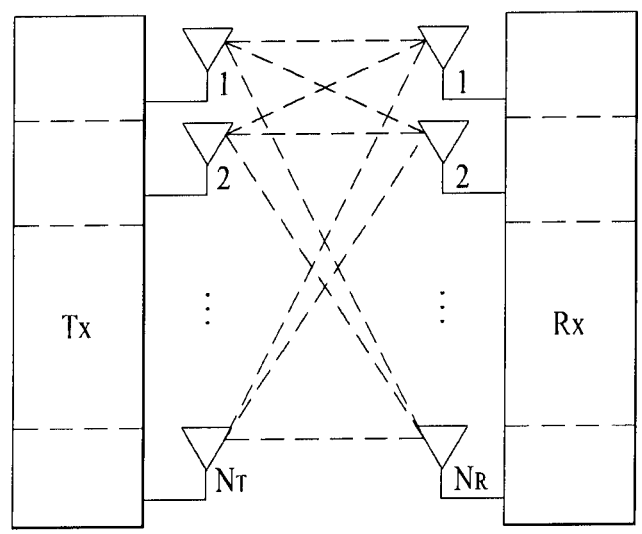
FIG. 6 is a diagram showing the configuration of a general MIMO communication system.

The configuration of a general MIMO communication system is shown in FIG. 6. A transmitting end is equipped with $N_T$ transmission antennas and a receiving end is equipped with $N_R$ reception antennas. If a plurality of antennas is used both in the transmitting end and in the receiving end, theoretical channel transmission capacity increases unlike the case where only either the transmitting end or the receiving end uses a plurality of antennas. Increase in channel transmission capacity is proportional to the number of antennas, thereby improving transmission rate and frequency efficiency. If a maximum transmission rate when using a signal antenna is $R_o$, a transmission rate when using multiple antennas can be theoretically increased by the product of the maximum transmission rate $R_o$ by a rate increment $R_i$. The rate increment $R_i$ is represented by the following equation 1 where $R_i$ is the smaller of $N_T$ and $N_R$.

$$R_i = \min(N_T, N_R) \quad \text{[Equation 1]}$$

For example, in a MIMO communication system using four transmission antennas and four reception antennas, it is possible to theoretically acquire a transmission rate four times that of a single antenna system. After an increase in the theoretical capacity of the MIMO system was first proved in the mid-1990s, various techniques for substantially improving data transmission rate have been under development. Several of these techniques have already been incorporated into a variety of wireless communication standards including, for example, 3$^{rd}$ generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

To describe a communication method in a MIMO system in detail, a mathematical model thereof is given below. As shown in FIG. 6, it is assumed that $N_T$ transmission antennas and $N_R$ reception antennas are present. In the case of a transmission signal, a maximum number of transmittable pieces of information is $N_T$ under the condition that $N_T$ transmission antennas are used, so that transmission information can be represented by a vector represented by the following equation 2:

$$S = [S_1, S_2, \ldots, S_{N_T}]^T \quad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3:

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, using a diagonal matrix P of a transmission power, $\hat{s}$ can be represented by the following Equation 4:

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

A weight matrix W may be applied to the information vector $\hat{s}$ having adjusted transmission powers to configure $N_T$ transmission signals $x_1, x_2, \ldots, x_{N_T}$ to be actually transmitted. In this case, the weight matrix is adapted to properly distribute transmission information to individual antennas according to transmission channel situations. The transmission signals $x_1, x_2, \ldots, x_{N_T}$ can be represented by the following Equation 5 using a vector X, where $w_{ij}$ is a weight between the i-th transmission antenna and the j-th information, and W is a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs \quad \text{[Equation 5]}$$

Generally, the physical meaning of a rank of a channel matrix may be a maximum number of different transmittable information in a given channel. Accordingly, since the rank of the channel matrix is defined as the smaller of the number of rows or columns, which are independent of each other, the rank of the matrix is not greater than the number of rows or columns. A rank rank (H) of a channel matrix H is restricted as follows.

$$\text{rank}(H) \leq \min(N_T, N_R) \quad \text{[Equation 6]}$$

Define each of different information transmitted using MIMO technology as a 'transmission stream' or simply 'stream'. The 'stream' may be referred to as a 'layer'. Then the number of transmission streams is not greater than a rank of a channel which is a maximum number of different transmittable information. Accordingly, the channel matrix h may be indicted by the following Equation 7:

$$\text{\# of streams} \leq \text{rank}(H) \leq \min(N_T, N_R) \quad \text{[Equation 7]}$$

where '# of streams' denotes the number of streams. It should be noted that one stream can be transmitted through one or more antennas.

There may be various methods of allowing one or more streams to correspond to multiple antennas. These methods may be described as follows according to types of MIMO technology. The case where one stream is transmitted via multiple antennas may be called spatial diversity, and the case where multiple streams are transmitted via multiple antennas may be called spatial multiplexing. It is also possible to configure a hybrid type of the spatial diversity and the spatial multiplexing.

Hereinafter, a Reference Signal (RS) will be described in detail. For channel measurement, an RS, of which both a transmitting side and a receiving side are aware, is generally transmitted from the transmitting side to the receiving side together with data. Such an RS functions to perform a demodulation process by informing the transmitting and receiving sides of a modulation scheme as well as channel measurement. The RS is divided into a Dedicated RS (DRS) for an eNB and a specific UE, i.e. a UE-specific RS, and a Common RS (CRS) which is a cell-specific RS for all UEs within a cell. The cell-specific RS includes an RS for reporting CQI/PMI/RI measured by a UE to an eNB and such RS is referred to as a Channel Station Information-RS (CSI-RS).

Figure 7:
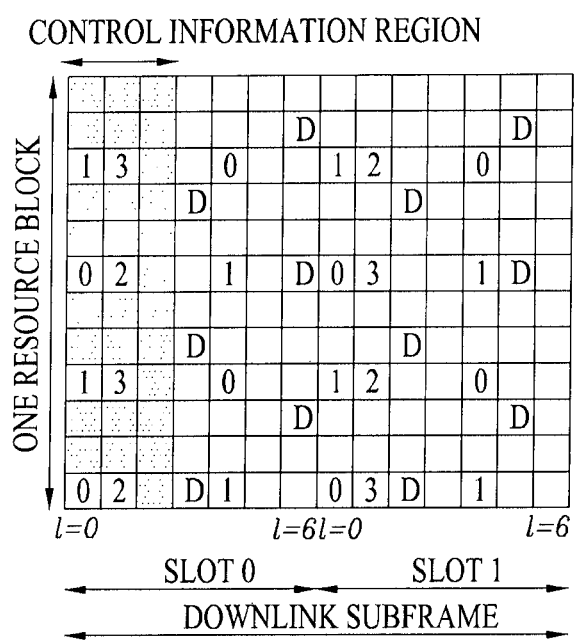
FIGS. 7 and 8 are diagrams showing the structure of a reference signal in an LTE system supporting downlink transmission using 4 antennas.
Figure 8:
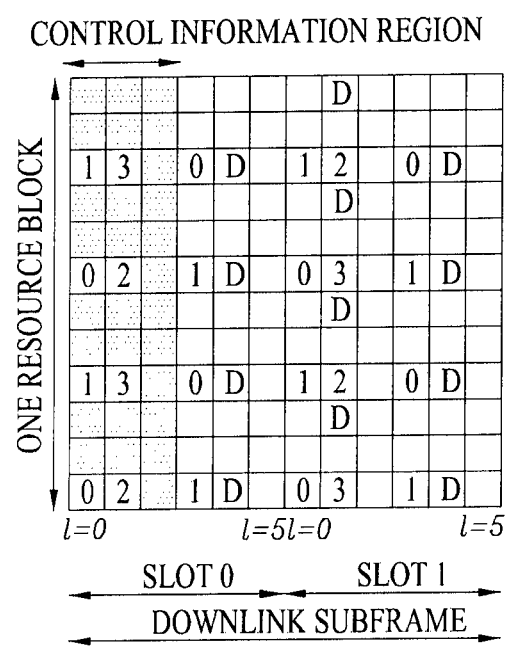

FIGS. 7 and 8 are diagrams showing the structure of an RS in an LTE system supporting downlink transmission using 4 antennas. Especially, FIG. 7 is for a normal Cyclic Prefix (CP) and FIG. 8 is for an extended CP.

Referring to FIGS. 7 and 8, '0' to '3' indicated in the lattice correspond to antenna ports 0 to 3, respectively, and denote CRSs which are cell-specific RSs transmitted for channel measurement and data demodulation. The CRSs, which are cell-specific RSs, may be transmitted to a UE through all control information regions as well as a data information region.

'D's indicated in the lattice denote downlink Demodulation-RSs (DM-RSs) which are UE-specific RSs. The DM-RSs support single-antenna port transmission through a PDSCH. Whether DM-RSs, which are UE-specific RSs, are present is signaled to a UE through an upper layer. FIGS. 7 and 8 show DM-RSs corresponding to an antenna port 5. DM-RSs for antenna ports 7 to 14 are defined in 3GPP standard document 36.211.

Meanwhile, a mapping rule of an RS to a Resource B Block (RB) may be expressed by Equations 8 to 10. The following Equation 8 indicates a CRS mapping rule, Equation indicates a DRS mapping rule to which a normal CP is applied, and Equation 10 indicates a DRS mapping rule to which an extended CP is applied.

$$k = 6m + (v + v_{shift}) \bmod 6 \quad \text{[Equation 8]}$$

$$l = \begin{cases} 0, N_{symb}^{DL} & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

$$k = (k') \bmod N_{sc}^{RB} + N_{sc}^{RB} \cdot n_{PRB} \quad \text{[Equation 9]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 10]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 8 to 10, k and p denote a subcarrier index and an antenna port, respectively. $N_{RB}^{DL}$, $n_s$, and $N_{cell}^{ID}$ denote the number of RBs allocated to downlink, the number of slot indexes, and the number of cell IDs, respectively. The location of the RS in a frequency domain depends on a value $V_{shift}$.

Meanwhile, in an LTE-A system which is a standard of a future-generation mobile communication system, a Coordinated Multi-Point (CoMP) transmission scheme, which has not been supported in conventional standards, is expected to be supported in order to improve data transmission rate. The CoMP transmission scheme refers to a transmission scheme in which two or more eNBs or cells coordinately communicate with a UE to improve communication performance between a UE located in a shadow area and an eNB (or cell or sector).

The CoMP transmission scheme may be divided into a coordinated MIMO type of Joint Processing (CoMP-JP) scheme through data sharing and a CoMP-Coordinated Scheduling/Beamforming (CoMP-CS/CB) scheme.

In the downlink of the CoMP-JP scheme, a UE may instantaneously and simultaneously receive data from eNBs performing a CoMP transmission scheme and may combine signals received from the respective eNBs, thereby improving reception performance. In the CoMP-CS/CB scheme, however, the UE may instantaneously receive data from one eNB through beamforming.

In the uplink of the CoMP-JP scheme, respective eNBs may simultaneously receive a PUSCH signal from a UE. In the CoMP-CS/CB scheme, however, only one eNB receives the PUSCH signal. Whether to use the CoMP-CS/CB scheme is determined by coordinated cells (or eNBs).

First Embodiment

In the first embodiment of the present invention, in applying the CoMP-JP scheme of the CoMP transmission scheme, a method is proposed in which a UE divides a total subframe into a plurality of interference measurement subframe sets, performs interference measurement and CSI reporting for each interference measurement subframe set, and differently configures a CSI-RS for CSI measurement with respect each interference measurement subframe set.

In more detail, a serving eNB configures a plurality of interference measurement subframe sets and a plurality of CSI-RS configuration information for a UE, and separately designates CSI-RS configuration information which is used by a UE during signal measurement for CSI reporting using a specific interference measurement subframe set among the plurality of interference measurement subframe sets. According to this method, a UE may perform data transmission and reception and a CSI reporting operation for data transmission and reception, using CSI-RS configuration information optimized for interference characteristics in each interference measurement subframe set.

Here, optimizing the CSI-RS configuration information for interference characteristics in each interference measurement subframe set means that precoding of a CSI-RS, the number of antenna ports, and the like can be adjusted according to interference characteristics in each interference measurement subframe set. Each CSI-RS configuration information may be classified according to the following criteria 1) and 2).

1) Upon signaling multiple CSI-RS configuration information, a serving eNB may signal multiple CSI-RS configuration information having different beam directions. To this end, the present invention proposes that a CSI-RS form a beam direction through precoding. Upon receiving signaling of multiple CSI-RS configuration information having different beam directions, a UE may perform measurement per CSI-RS configuration information and report CSI. In this case, the UE need not be aware of information about a beam direction of corresponding configuration information. The serving eNB may also signal CSI-RS configuration information having a different number of antennas ports or different cell IDs.

2) Upon signaling CSI-RS configuration information for multiple eNBs, a serving eNB may signal CSI-RS configuration information of coordinated cells or neighbor cells to a UE as independent subframe sets.

For the above criteria 1) and 2), an eNB may signal a CSI-RS location, periodicity, and the number of antenna ports, for each CSI-RS configuration information to a UE. The eNB may report CSI information calculated by the above information with respect to each combination of CSI-RS configuration information and an interference measurement subframe set. Alternatively, the eNB may report combinations of the CSI-RS configuration information and the interference measurement subframe set as one CSI. In a process of integrating a plurality of combinations into one, additional information may be inserted into existing CSI.

Although the above description has been given based on combinations of the CSI-RS configuration information and the interference measurement subframe set, only the CSI-RS configuration information excluding the interference measurement subframe set may be used for CSI reporting. In this case, CSI for each of the CSI-RS configuration information may be reported or CSI-RS configuration information may be reported as one integrated CSI.

Figure 9:
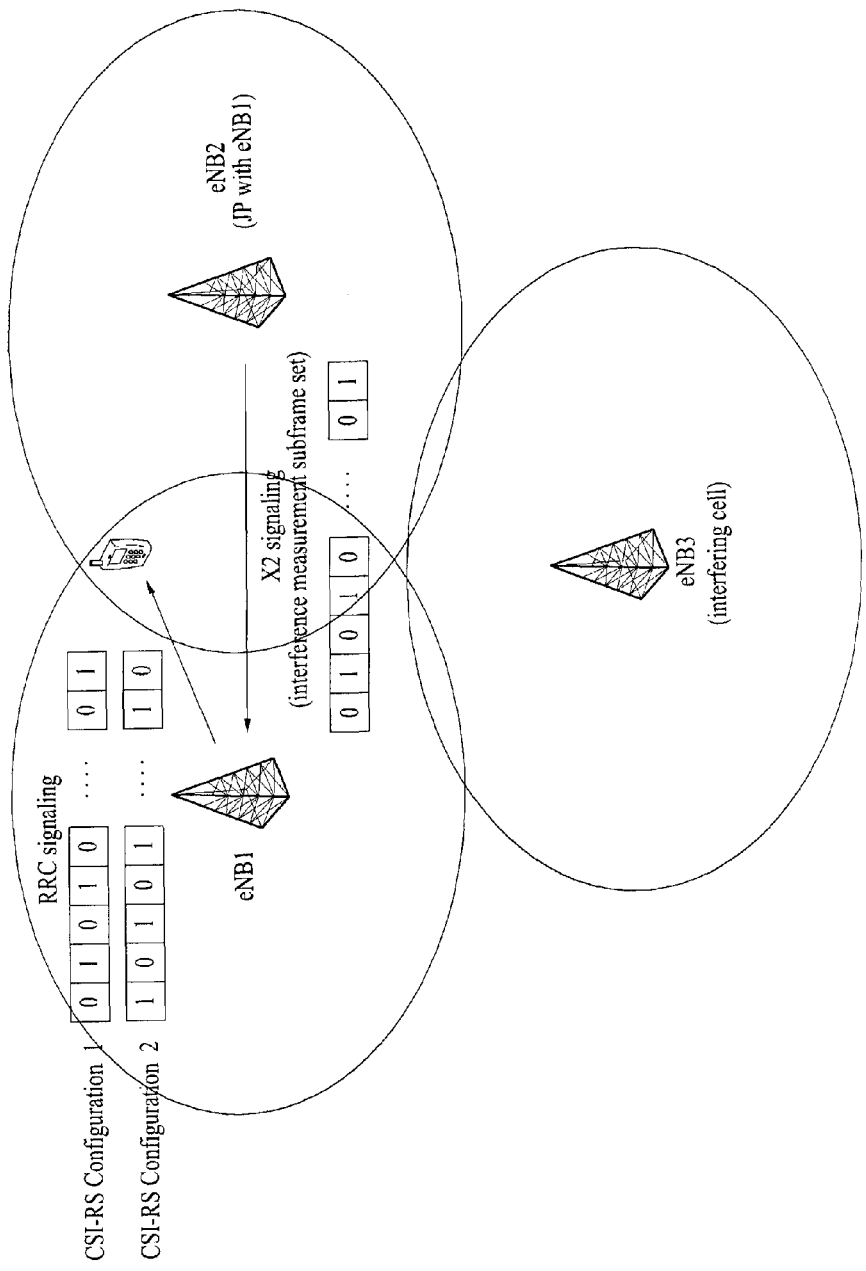
FIG. 9 is a diagram explaining a joint processing scheme according to a first embodiment of the present invention.

FIG. 9 is a diagram explaining a CoMP-JP scheme according to a first embodiment of the present invention.

An interference measurement subframe set in which a UE performs measurement may be divided into a first type of subframe and a second type of subframe according to whether a CRS transmitted by an eNB1 of a serving cell is subject to interference by a signal transmitted by an eNB2 of a cell performing CoMP-JP.

The first type of subframe refers to a subframe in which a CRS of an eNB1 is not subject to interference caused by an eNB2. For example, since the eNB2 may designate one or more specific subframes as an Almost Blank Subframe (ABS) and/or a Multicast Broadcast Single Frequency Network (MBSFN) subframe, interference caused by signal transmission of the eNB2 does not occurs in the CRS of the eNB1.

The second type of subframe refers to a subframe in which the CRS of the eNB1 is subject to interference caused by the eNB2. For example, the second type of subframe may include a subframe in which the eNB2 does not perform a CoMP-JP scheme together with the eNB1, (i.e. subframe in which a single cell operation of the eNB2 is performed). The second type of subframe may further include a subframe to which a CoMP-CB scheme is applied. For the CoMP-CB scheme, the eNB2 may configure subframes, through an X2 interface, in which it may be assumed that the same intercell interference with the eNB1 exists.

Especially, in FIG. 9, an interference measurement subframe set signaled to the eNB1 by the eNB2 through the X2 interface is expressed in a bitmap form. If a bit value corresponding to a specific subframe is '1', this means that the subframe is designated as an ABS. A single cell operation or a CoMP-CB scheme may be applied to a subframe having a bit value of '0'. If the CoMP-CB scheme is applied, it may be interpreted that a UE belonging to a cell of the eNB1 has interference characteristics which are the same as those caused by the eNB2 in a corresponding subframe. Namely, a bit value of '1' corresponds to the first type of subframe and a bit value of '0' corresponds to the second type of subframe.

In FIG. 9, first CSI-RS configuration information signaled by the eNB1 to the UE corresponds to the first type subframe of the interference measurement subframe set. In this case, the CSI-RS means a CSI-RS transmitted by both the eNB1 and eNB2 for CoMP-JP.

Moreover, second CSI-RS configuration information signaled by the eNB1 to the UE corresponds to the second type subframe of the interference measurement subframe set and is for measuring CSI for a single cell operation of the eNB1 which is not CoMP-JP.

In FIG. 9, in the first type subframe to which the first CSI-RS configuration information is applied, the UE reports CSI when the eNB1 and the eNB2 perform CoMP-JP to the eNB1 in consideration of interference caused by an eNB3.

In the second type subframe to which the second CSI-RS configuration information is applied, the UE reports CSI for a single cell operation of the eNB1 which is not CoMP-JP in consideration of interference caused by the eNB2 and eNB3. If a CoMP-CB scheme between the eNB1 and eNB2 is applied, interference caused by the eNB2 has the same characteristic in the second type of subframe.

Figure 10:
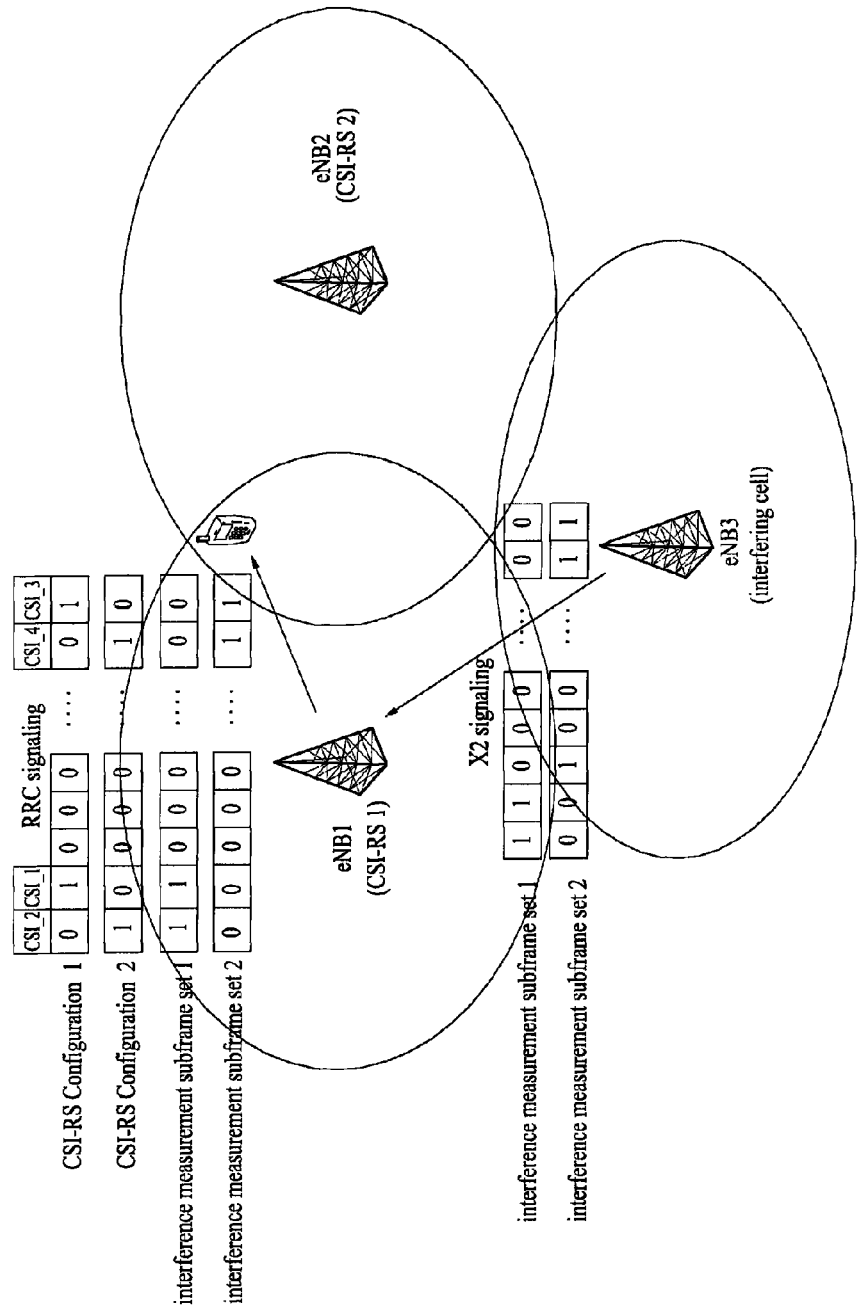
FIG. 10 is a diagram explaining another joint processing scheme according to the first embodiment of the present invention.

FIG. 10 is a diagram explaining another CoMP-JP scheme according to a first embodiment of the present invention. In FIG. 10, it is assumed that an eNB1 is a serving cell for a UE, the eNB1 and an eNB2 perform a CoMP operation such as JP or Dynamic Cell Selection (DCS), and an eNB3 is an interfering cell. It is also assumed that a CoMP-CB scheme is applied between the eNB3 and eNB1, and between the eNB3 and eNB2 so that the eNB3 signals respective subframe sets, in which it may be assumed that the same interference characteristic exists in a cell of the eNB1 and a cell of the eNB2, to the eNB1 and eNB2 through an X2 interface. The respective subframe sets indicate a first interference measurement subframe set and a second interference measurement subframe set.

Referring to FIG. 10, first CSI-RS configuration information corresponds to a CSI-RS transmitted by the eNB1 and second CSI-RS configuration information corresponds to a CSI-RS transmitted by the eNB2. In FIG. 10, a UE may report 4 independent CSI to the eNB1.

In more detail, in the first interference measurement subframe set, CSI (CSI_1) for transmission of the eNB1 is reported using the first CSI-RS configuration information and CSI (CSI_2) for transmission of the eNB2 is reported using the second CSI-RS configuration information. In the second interference measurement subframe set, CSI (CSI_3) for transmission of the eNB1 is reported using the first CSI-RS configuration information and CSI (CSI_4) for transmission of the eNB2 is reported using the second CSI-RS configuration information.

The eNB1 may perform a CoMP operation such as JP or DCS based on 4 CSI reported from the UE. For example, if CSI_1 and CSI_4 are reported as having a better channel environment than CSI_2 and CSI_3, respectively, a DCS scheme may be applied in which the eNB3 of the interfering cell receives CSI from the eNB1 in a subframe designated in the first interference measurement subframe set or from the eNB2 in a subframe designated in the second interference measurement subframe set. Moreover, the present invention has an advantage of enabling a smooth feedback procedure per cell necessary for a CoMP operation.

Second Embodiment

Meanwhile, it has been assumed in FIG. 9 that the eNB1 and eNB2 performs CoMP-JP and the eNB3 operates as an interfering cell. In the second embodiment of the present invention, it is proposed that the eNB1 and the eNB2 share a subframe set for measurement and a subframe set for CoMP-JP. The subframe set for measurement includes a region in which a UE measures interference, i.e. a specific subframe, or a time or frequency domain within the specific subframe. In this region, it is assumed that there is no interference from the eNB2. The subframe set for CoMP-JP indicates a set of subframes in which the eNB1 and eNB2 perform a comp-JP operation. The above two subframe sets may be configured by the following methods A) and B).

A) The eNB2 may signal a subframe set for measurement and a subframe set for CoMP-JP through X2 signaling. The eNB2 designates an ABS and/or an MBSFN subframe among the subframes belonging to the measurement subframe set so that the UE can measure interference from a neighbor cell without interference from the eNB2.

However, since both the eNB1 and eNB2 participate in transmission in the subframe set for CoMP-JP, interference measurement of the UE may be restricted. Accordingly, the eNB2 may signal the subframe set for measurement to the eNB1 and the eNB1 may designate some of the subframes for measurement as the subframe set for CoMP-JP to be signaled to the eNB2. Then, the eNB2 performs CoMP-JP without configuring an ABS in the subframe set for CoMP-JP.

B) The eNB2 may perform CoMP-JP in a corresponding subframe by signaling both a subframe set for measurement and a subframe set for CoMP-JP included in the subframe set for measurement.

In A), if the number of subframes for measurement is increased in order to improve the reliability of measurement, the eNB2 may configure a corresponding subframe as an ABS to measure interference from the eNB3 or neighbor cells, thereby resulting in waste of resources for CoMP-JP.

Therefore, the present invention proposes that, in subframes for CoMP-JP, the eNB2 not perform transmission except CRS transmission in a control region and perform CoMP-JP in a data region. Then the UE can measure interference using CRS transmitted through the control region in a corresponding subframe and the eNB1 of a serving cell can transmit a control signal for CoMP-JP. For this operation, the eNB1 may separately signal a subframe set for measuring interference using a total region of a subframe and a subframe set for measuring interference using only a control region to the UE.

The subframe set for interference measurement using only the control region may mean that CoMP-JP is performed through the data region of the corresponding subframe. If the UE has measured interference in a resource element of the control region in which a CRS is transmitted in the eNB of the serving cell, the eNB1 may configure a subframe for measuring interference using only the control region as an MBSFN subframe in which the CRS is not transmitted in the data region.

The eNB1 may signal only a subframe set for CoMP-JP to the UE and may inform the UE that a subframe for measurement uses only the MBSFN subframe.

Figure 11:
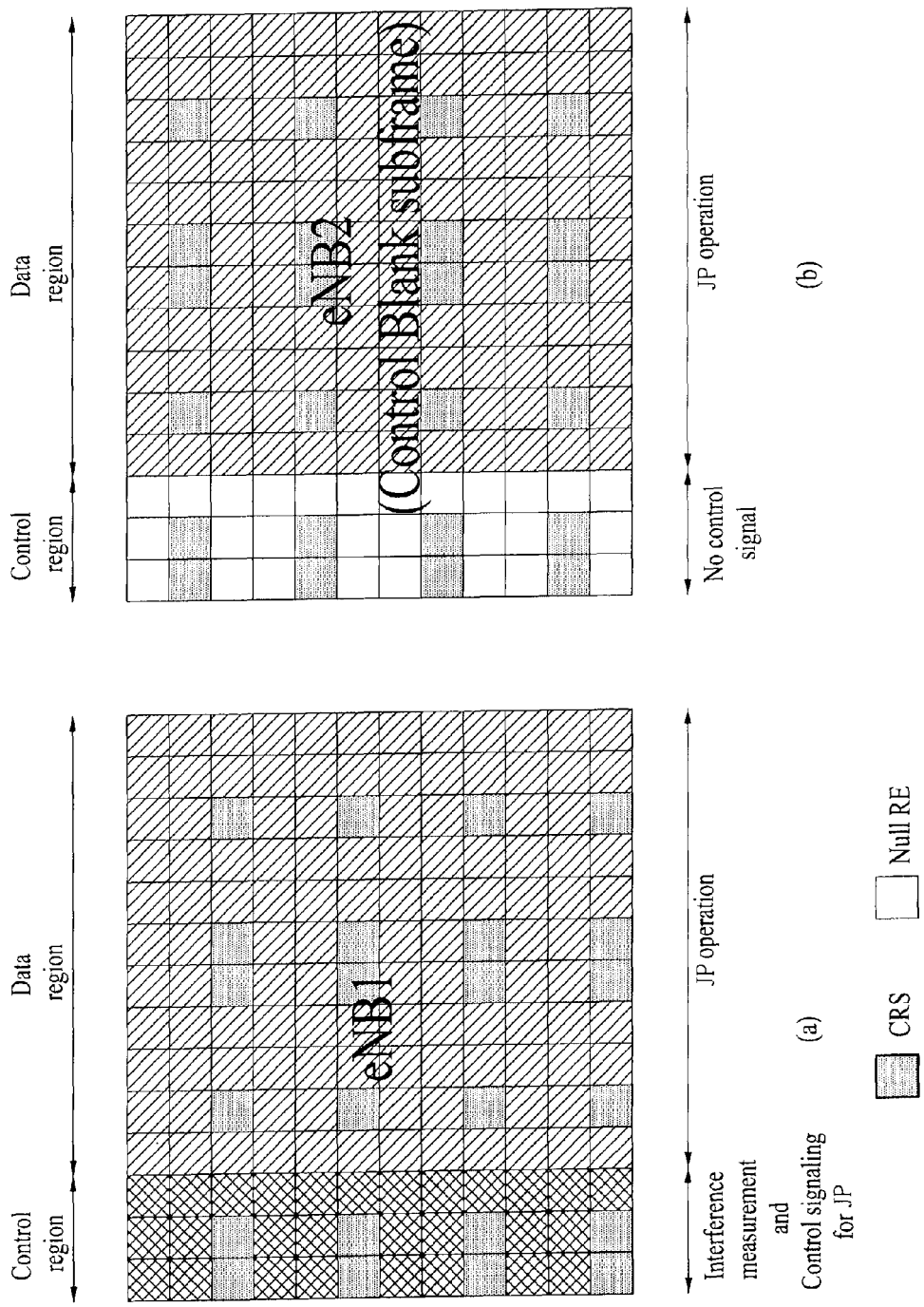
FIG. 11 is a diagram showing subframe configuration according to a second embodiment of the present invention.

FIG. 11 is a diagram showing subframe configuration according to a second embodiment of the present invention. In FIG. 11, the configuration of subframes included in a subframe set for CoMP-JP proposed in the above B) is illustrated.

Referring to FIG. 11, it is assumed that CRSs of a control region of an eNB1 do not suffer interference from an eNB2 and may be used to measure interference from an eNB3 and neighboring eNBs. The control region of the eNB1 may be used to transmit a control signal for CoMP-JP to the UE.

The eNB2 transmits only the CRSs in the control region to measure interference for CoMP-JP. To avoid CRS collision with the eNB1, CRSs of the eNB2 may desirably have a different $V_{shift}$ value from that of the CRS of the eNB1.

As shown in FIG. 11, the subframe of the eNB2, (hereinafter, Control Blank Subframe (CBS)), is similar to an ABS. In other words, the eNB2 does not transmit a PDCCH for scheduling of unicast data in the control region and desirably does not perform PDSCH transmission only for the eNB2 even in a data region.

A difference between CBS and ABS is that the eNB2 transmits a signal for PDSCH of a UE belonging to the eNB1 in the data region by CoMP-JP. Therefore, the CBS may be expressed as a subframe in which a specific indicator is enabled among subframes configured as ABSs. The specific indicator may be defined as an indicator indicating whether an interference reduction scheme is applied based on transmission, rather than non-transmission, in the data region.

Figure 12:
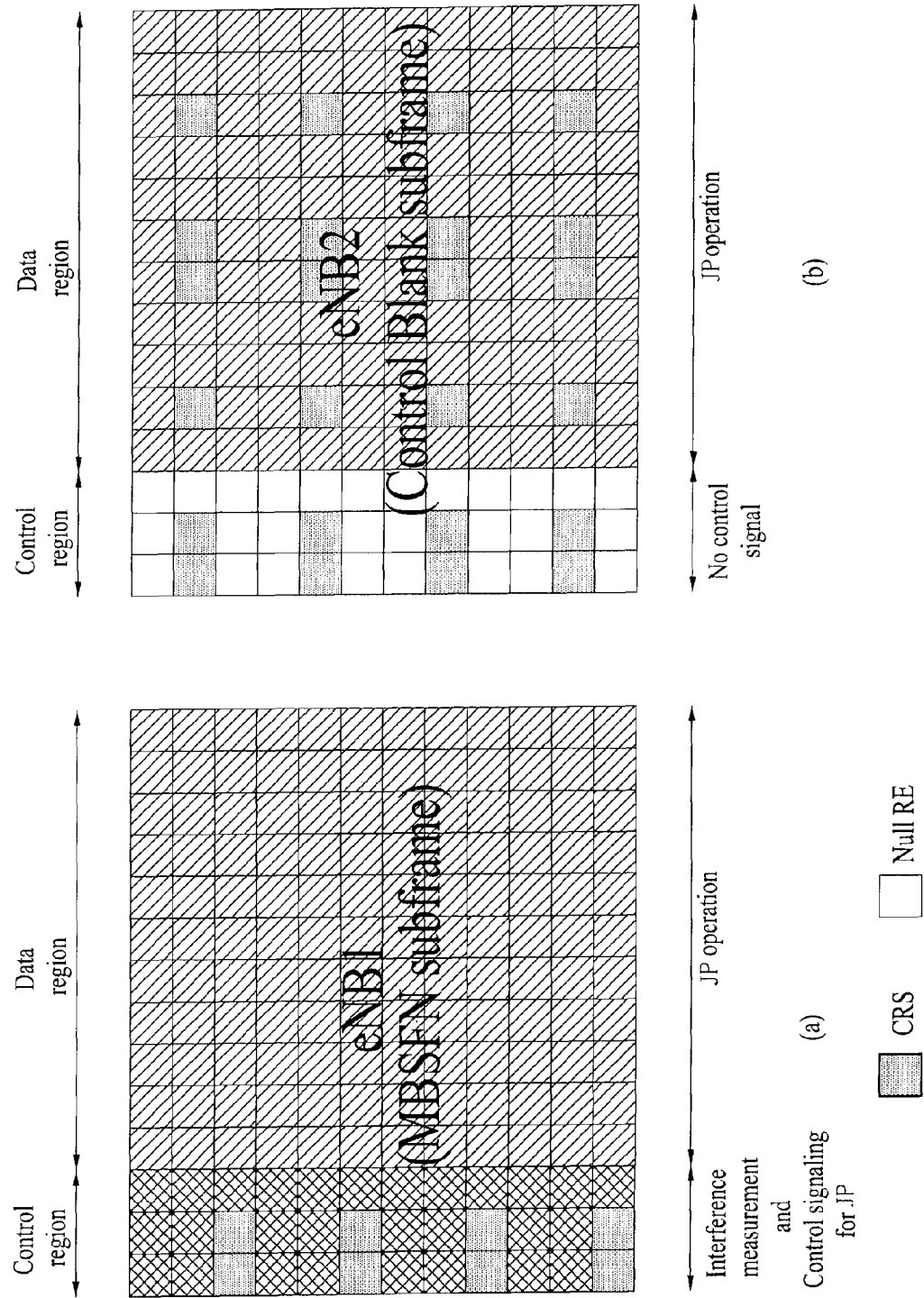
FIG. 12 is a diagram showing another subframe configuration according to the second embodiment of the present invention.

FIG. 12 is a diagram showing another subframe configuration according to the second embodiment of the present invention. In FIG. 12, an eNB1 signals a measurement subframe to a UE using MBSFN configuration. DMRS, a CSI-RS, etc. may be transmitted in a data region of the eNB1.

Meanwhile, a CBS may be used for reducing interference of a neighbor cell. For example, the CBS may be applied even when control signals for a plurality of subframes are transmitted through one subframe.

Third Embodiment

In the third embodiment of the present invention, a method is described in which an eNB signals CSI configuration information used when a UE performs signal measurement and CSI reporting.

First, it is proposed to signal CSI-RS configuration information using RRC signaling. This method is appropriate when semi-static reporting such as CSI reporting is performed. One CSI-RS configuration information is signaled in one RRC signaling and then measurement and CSI reporting may be performed using only corresponding CSI-RS configuration information until next RRC signaling. Alternatively, a plurality of CSI-RS configuration information and a subframe set in which each CSI-RS configuration information should be used may be signaled in one RRC signaling.

Meanwhile, CSI-RS configuration information may be dynamically signaled using a DCI formation transmitted through a PDCCH. Dynamic signaling may be used when scheduling is additionally performed or channel quality is additionally determined. Especially, dynamic signaling is useful for aperiodic CSI reporting. To this end, a new field for signaling CSI-RS configuration information may be added to an existing DCI format or an existing field may be expanded.

In the case of a combination of semi-static signaling and dynamic signaling, an eNB may inform a UE of possible CSI-RS configuration information through RRC signaling and dynamically signal any CSI-RS configuration information which should be used during CSI reporting among CSI-RS configuration information RRC-signaled through a DCI format.

For example, an additional 2-bit field may be defined in the DCI format. If the bit value is '00', '01', '10', and '11', then CSI-RS configuration information such as 'default CSI-RS configuration information', 'CSI-RS configuration information 1', 'CSI-RS configuration information 2', and 'CSI-RS configuration information 3', respectively, may be signaled. In addition to the definition of the 2-bit field, a field related to CSI reporting among predefined fields, for example, a CSI request field may be configured by extending the number of bits thereof and a specific field having a reserved state may be used.

Figure 13:
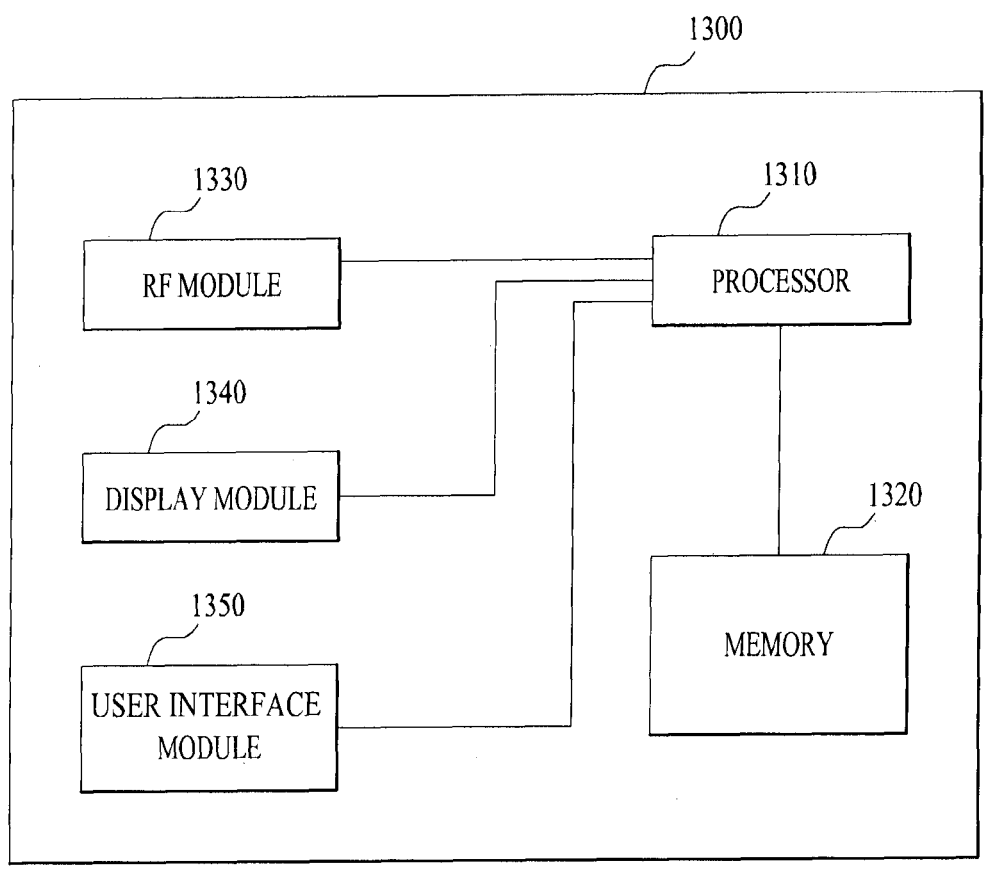
FIG. 13 is a block diagram showing the configuration of a communication device according to an exemplary embodiment of the present invention.

FIG. 13 is a block diagram showing the configuration of a communication device according to an exemplary embodiment of the present invention.

Referring to FIG. 13 a communication device 1300 includes a processor 1310, a memory 1320, an RF module 1330, a display module 1340, and a user interface module 1350.

The communication device 1300 is depicted for convenience of description and some modules may be omitted. The communication device 1300 may further include necessary modules. Some modules of the communication device 1300 may be further divided into segmented modules. The processor 1310 is configured to operate according to the exemplary embodiments of the present invention described with reference to the drawings. For a detailed operation of the processor 1310, reference may be made to a description in conjunction with FIGS. 1 to 12.

The memory 1320 is connected to the processor 1310 and stores operating systems, applications, program code, data, and the like. The RF module 1330 is connected to the processor 1310, and converts a baseband signal into a radio signal or a radio signal into a baseband signal. To this end, the RF module 1330 performs analog conversion, amplification, filtering, and frequency up-conversion or performs the inverse of these processes. The display module 1340 is connected to the processor 1310 and displays a variety of information. The display module 1340 uses, but is not limited to, a well-known element such as a Liquid Crystal Display (LCD), a Light Emitting Diode (LED), an Organic Light Emitting Diode (OLED), or the like. The user interface module 1350 is connected to the processor 1310 and may be configured by a combination of well-known user interfaces such as a keypad, a touchscreen, etc.

The above-described exemplary embodiments are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the embodiments may be constructed by a combination of claims which do not have an explicit cited relation in the appended claims or may include new claims by amendment after application.

In the present document, a description of embodiments of the present invention has been made of a data transmission and reception relationship between a UE and an eNB. Here, a specific operation described as being performed by the eNB may be performed by an upper node of the eNB. Namely, it is apparent that, in a network comprised of a plurality of network nodes including the eNB, various operations performed for communication with the UE may be performed by the eNB, or network nodes other than the eNB. The term eNB may be replaced with the terms 'fixed station', 'Node B', 'base station', 'access point', etc.

The exemplary embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the above-described method and apparatus for reducing intercell interference in a wireless communication system has been described as being applied to a 3GPP LTE system, they may be applied to various wireless communication systems in addition to the 3GPP LTE system.

The invention claimed is:

1. A signal processing method of a user equipment in a wireless communication system, comprising:
   receiving a first interference measurement subframe set and a second interference measurement subframe set from a serving cell, wherein subframes included in the second interference measurement subframe set are configured to have different interference from subframes included in the first interference measurement subframe set;
   receiving first Channel Status Information (CSI) configuration information and second CSI configuration information from the serving cell;
   in a subframe designated in the first interference measurement subframe set, measuring a CSI for the first interference measurement subframe set based on each of the first CSI configuration information and the second CSI configuration information and reporting one measured CSI for the first interference measurement subframe set based on the first CSI configuration information or the second CSI configuration information; and
   in a subframe which is designated in the second interference measurement subframe set, measuring a CSI for the second interference measurement subframe set based on each of the first CSI configuration information and the second CSI configuration information and reporting one measured CSI for the second interference measurement subframe set based on the first CSI configuration information or the second CSI configuration information.

2. The signal processing method according to claim 1, wherein the first interference measurement subframe set and the second interference measurement subframe set are received from a neighbor cell by the serving cell through an X2 interface.

3. The signal processing method according to claim 2, wherein the neighbor cell configures the subframe designated in the first interference measurement subframe set as an Almost Blank Subframe (ABS) and/or a Multicast Broadcast Single Frequency Network (MBSFN) subframe.

4. The signal processing method according to claim 2, wherein the neighbor cell performs joint processing transmission for the user equipment together with the serving cell in the subframe designated in the first interference measurement subframe set.

5. The signal processing method according to claim 1, wherein the first interference measurement subframe set, the second interference measurement subframe set, the first CSI configuration information, and the second CSI configuration information are received from the serving cell through an upper layer.

6. The signal processing method according to claim 1, wherein the first CSI configuration information and the second CSI configuration information are received from the serving cell through an upper layer, and
   wherein the serving cell designates the first CSI configuration information through a Physical Downlink Control Channel (PDCCH) in the subframe designated in the first interference measurement subframe set and in the second interference measurement subframe set and designates the second CSI configuration information through the PDCCH in the subframe designated in the first interference measurement subframe set and in the second interference measurement subframe set.

7. A user equipment in a wireless communication system, comprising:
   a reception module for receiving a first interference measurement subframe set, a second interference measurement subframe set, first Channel Status Information (CSI) configuration information and second CSI configuration information from a serving cell;
   a processor for measuring a CSI based on each of the first CSI configuration information and the second CSI configuration information in a subframe designated in the first interference measurement subframe set, and measuring a CSI based on each of the first CSI configuration information and the second CSI configuration information in a subframe designated in the second interference measurement subframe set; and
   a transmission module for transmitting to the serving cell, one CSI based on the first CSI configuration information or the second CSI configuration information corresponding to the first interference measurement subframe set, and transmitting one CSI based on the first CSI configuration information or the second CSI configuration information corresponding to the second CSI measurement subframe set,
   wherein subframes included in the second interference measurement subframe set are configured to have different interference from subframes included in the first interference measurement subframe set.

8. The user equipment according to claim 7, wherein the first interference measurement subframe set is received from a neighbor cell by the serving cell through an X2 interface.

9. The user equipment according to claim 8, wherein the neighbor cell configures the subframe designated in the first interference measurement subframe set as an Almost Blank Subframe (ABS) and/or a Multicast Broadcast Single Frequency Network (MBSFN) subframe.

10. The user equipment according to claim 8, wherein the neighbor cell performs joint processing transmission for the user equipment together with the serving cell in the subframe designated in the first interference measurement subframe set.

11. The user equipment according to claim 7, wherein the first interference measurement subframe set, the second interference measurement subframe set, the first CSI configuration information, and the second CSI configuration information are received from the serving cell through an upper layer.

12. The user equipment according to claim 7, wherein the first CSI configuration information and the second CSI configuration information are received from the serving cell through an upper layer, and
   wherein the serving cell designates the first CSI configuration information through a Physical Downlink Control Channel (PDCCH) in the subframe designated in the first interference measurement subframe set and in the subframe designated in the second interference measurement subframe set and designates the second CSI configuration information through the PDCCH in the subframe designated in the first interference measurement subframe set and in the subframe designated in the second interference measurement subframe set.

\* \* \* \* \*